US012027707B2

(12) United States Patent
Verbist et al.

(10) Patent No.: US 12,027,707 B2
(45) Date of Patent: Jul. 2, 2024

(54) ELECTRIC ENERGY STORAGE DEVICE

(71) Applicant: SHELL OIL COMPANY, Houston, TX (US)

(72) Inventors: Guy Lode Magda Maria Verbist, Amsterdam (NL); Christina Georgieva Christova-Zdravkova, Eindhoven (NL); Alexey Deyko, Eindhoven (NL); Erik Maria Kelder, Delft (NL); Indranil Rudra, 562149 (IN)

(73) Assignee: SHELL USA, INC., Houston, TX (US)

( * ) Notice: Subject to any disclaimer, the term of this patent is extended or adjusted under 35 U.S.C. 154(b) by 464 days.

(21) Appl. No.: 17/424,982

(22) PCT Filed: Jan. 21, 2020

(86) PCT No.: PCT/EP2020/051327
§ 371 (c)(1),
(2) Date: Jul. 22, 2021

(87) PCT Pub. No.: WO2020/152119
PCT Pub. Date: Jul. 30, 2020

(65) Prior Publication Data
US 2022/0093926 A1    Mar. 24, 2022

(30) Foreign Application Priority Data
Jan. 25, 2019   (EP) .................................... 19153698

(51) Int. Cl.
*H01M 4/00*   (2006.01)
*H01M 4/46*   (2006.01)
(Continued)

(52) U.S. Cl.
CPC ............. *H01M 4/60* (2013.01); *H01M 4/466* (2013.01); *H01M 4/661* (2013.01);
(Continued)

(58) Field of Classification Search
CPC ............ H01M 4/42; H01M 4/13; H01M 4/38; H01M 4/134; H01M 4/60; H01M 4/667;
(Continued)

(56) References Cited

U.S. PATENT DOCUMENTS 3,925,331 A   12/1975  Ely
4,096,131 A    6/1978  Price et al.
(Continued)

FOREIGN PATENT DOCUMENTS

CN          1053324 A      7/1991
CN        103199250 A      7/2013
(Continued)

OTHER PUBLICATIONS

Kamine et al., Non-aqueous Secondary Battery, Feb. 2013, See the Abstract. (Year: 2013).*
(Continued)

*Primary Examiner* — Cynthia H Kelly
*Assistant Examiner* — Monique M Wills
(74) *Attorney, Agent, or Firm* — SHELL USA, INC.

(57) ABSTRACT

The present invention relates to an electric energy storage device, in particular a battery, at least comprising: —an anode comprising a divalent metal selected from magnesium, calcium, beryllium and zinc or a combination thereof or an alloy comprising at least one of these metals; —a cathode comprising elemental sulphur, or a sulphur-containing organosilane compound, or a mixture of sulphur-containing organosilane compounds, or a mixture of sulphur and sulphur-containing organosilane compounds grafted on the surface of the cathode; and—an electrolyte placed between the anode and the cathode; wherein the cathode comprises a current collector surface that has been at least partly modi-
(Continued)

fied by grafting the sulphur-containing organosilane compound or a mixture of sulphur-containing organosilane compounds thereon.

6 Claims, 2 Drawing Sheets

(51) Int. Cl.
H01M 4/60 (2006.01)
H01M 4/66 (2006.01)
H01M 10/054 (2010.01)
H01M 4/02 (2006.01)
H01M 4/62 (2006.01)

(52) U.S. Cl.
CPC .... H01M 10/054 (2013.01); H01M 2004/027 (2013.01); H01M 2004/028 (2013.01); H01M 4/625 (2013.01); H01M 4/626 (2013.01)

(58) Field of Classification Search
CPC ............... H01M 4/466; H01M 10/054; H01M 2004/028; H01M 2004/027; Y02E 60/10
See application file for complete search history.

(56) References Cited

U.S. PATENT DOCUMENTS

| | | | |
|---|---|---|---|
| 4,384,132 | A | 5/1983 | Schwarz et al. |
| 6,114,560 | A | 9/2000 | Ichinohe et al. |
| 7,019,160 | B2 | 3/2006 | Korth et al. |
| 8,308,971 | B1 | 11/2012 | Bhat et al. |
| 8,703,344 | B2 | 4/2014 | Bhat et al. |
| 8,877,385 | B2 | 11/2014 | Kamine et al. |
| 9,257,697 | B2 | 2/2016 | Oya et al. |
| 9,647,272 | B1 | 5/2017 | Cheng et al. |
| 9,876,211 | B2 | 1/2018 | Son et al. |
| 9,979,008 | B2 | 5/2018 | Dai et al. |
| 10,079,405 | B2 | 9/2018 | Smith et al. |
| 10,355,313 | B2 | 7/2019 | Pena Hueso et al. |
| 10,559,817 | B2 | 2/2020 | Bucur et al. |
| 2004/0157122 | A1 | 8/2004 | Naoi et al. |
| 2004/0197653 | A1 | 10/2004 | Inatomi et al. |
| 2005/0042515 | A1 | 2/2005 | Hwang et al. |
| 2006/0106241 | A1 | 5/2006 | Yanagisawa |
| 2009/0165760 | A1 | 7/2009 | Buttery et al. |
| 2009/0241882 | A1 | 10/2009 | Brunner et al. |
| 2011/0244338 | A1 | 10/2011 | Muldoon et al. |
| 2015/0155549 | A1 | 6/2015 | Moganty et al. |
| 2015/0303460 | A1 | 10/2015 | Murata et al. |

FOREIGN PATENT DOCUMENTS

| | | | | |
|---|---|---|---|---|
| CN | 104716297 | A | 6/2015 | |
| CN | 105742587 | A | 7/2016 | |
| CN | 107845812 | A | 3/2018 | |
| CN | 108598376 | A | 9/2018 | |
| CN | 109004231 | A | 12/2018 | |
| EP | 0732362 | A1 | 9/1996 | |
| EP | 2610228 | A1 | 7/2013 | |
| EP | 2924784 | A1 | 9/2015 | |
| EP | 3348600 | A1 | 7/2018 | |
| JP | 2001226383 | A | 8/2001 | |
| JP | 2001226532 | A | 8/2001 | |
| JP | 2011023303 | A | 2/2011 | |
| JP | 2011228282 | A | 11/2011 | |
| JP | 5144832 | B1 * | 2/2013 | ............ H01M 10/05 |
| JP | 2014522078 | A | 8/2014 | |
| JP | 2017517603 | A | 6/2017 | |
| JP | 2018065980 | A | 4/2018 | |
| JP | 2018181549 | A * | 11/2018 | ............ H01M 10/05 |
| KR | 20020025379 | A | 4/2002 | |
| KR | 101717209 | B1 | 3/2017 | |
| WO | 2007065920 | A2 | 6/2007 | |
| WO | 2008148814 | A2 | 12/2008 | |
| WO | 2008152054 | A1 | 12/2008 | |
| WO | 2010012601 | A1 | 2/2010 | |
| WO | 2018147404 | A1 | 8/2018 | |
| WO | 2019020561 | A1 | 1/2019 | |

OTHER PUBLICATIONS

Hojo et al.,Electrolyte Solution for Battery and Secondary Battery Using the Same, Nov. 2018, See the Abstract. (Year: 2018).*
Office Action Received for Chinese Application No. 202080009800. 3, Mailed on Oct. 9, 2022, 22 Pages(12 Pages of English Translation and 10 Pages of Official Copy).
Office Action Received for Chinese Application No. 202080009800. 3, Mailed May 11, 2022, 25 Pages (10 Pages of English Translation and 15 Pages of Official Copy).
Office Action Received for Indian Application No. 202047007240, Mailed on Mar. 10, 2022, 06 Pages of Official Copy.
Office Action Received for Taiwan Application No. 107125317, Mailed on Nov. 11, 2021, 11 Pages (8 Pages of English Translation and 3 Pages of Official Copy).
Zhao-Karger et al., "Performance Improvement of Magnesium Sulfur Batteries with Modified Non-nucleophilic Electrolytes", Advanced Energy Materials, Feb. 4, 2015, vol. 5, Issue No. 3, 9 Pages.
Office Action Received for Japanese Application No. 2020-503789, Mailed on Apr. 18, 2022, 6 Pages (3 Pages of English Translation and 3 Pages of Official Copy).
Thompson et al., "Stabilization of lithium metal anodes using silane-based coatings", Electrochemistry Communications, vol. 13, Issue 12, Dec. 2011, pp. 1369-1372.
Liu et al., "The Effect of Dichlorodimethylsilane on the Properties of Li—S Cell", Guangzhou Chemical Industry, vol. 42, No. 6, Mar. 2014, 3 Pages. (English Abstract only).
International Search Report and Written Opinion received for PCT Patent Application No. PCT/EP2020/051327, mailed on Feb. 20, 2020, 10 pages.
Zhao-Karger et al., "Beyond Intercalation Chemistry for Rechargeable Mg Batteries: A Short Review and Perspective", Frontiers in Chemistry, vol. 6, Jan. 1, 2019, XP055562539.
Xing et al., Communication-Organic Silane Coupling Agent Si-69: A New Organosulfur Cathode Material for Rechargeable Lithium Batteries, Journal of Electrochemical Society, vol. 165, Issue No. 16, Dec. 7, 2018, pp. A3782-A3784, XP055562467.
Zhao-Karger et al., "Magnesium-sulfur Battery: Its Beginning and Recent Progress", MRS Communications, 2017, vol. 7, pp. 770-784.
Manthiram et al., "Rechargeable Lithium-Sulphur Batteries", Chem. Rev., 2014, vol. 114, pp. 11751-11787.
Wei et al., "A Stable Room-temperature Sodium-sulfur Battery", Nature Communicatins 7, Article No. 117222, Jun. 9, 2016, [doi 10.1038/ncomms11722], 10 pages.
Patel et al., "Li—S Battery Analyzed by UV/Vis in Operando Mode", ChemSusChem, vol. 6, Issue No. 7, Jul. 2013, pp. 1177-1181.
International Search Report and Written Opinion received for PCT Patent Application No. PCT/EP2018/069903, mailed on Sep. 11, 2018, 09 pages.
International Search Report and Written Opinion received for PCT Patent Application No. PCT/EP2019/068993, mailed on Aug. 12, 2019, 10 pages.
Office Action Received for Japanese Application No. 2021-542319, Mailed on Nov. 28, 2023, 18 Pages(10 Pages of English Translation and 08 Pages of Official Copy).
Office Action Received for Chinese Application No. 202080009800. 3, Mailed on Jan. 20, 2023, 16 Pages(10 Pages of English Translation and 06 Pages of Official Copy).
Office Action Received for Japanese Application No. 2021-501283, Mailed on Sep. 1, 2023, 11 Pages(6 Pages of English Translation and 5 Pages of Official Copy).

* cited by examiner

ELECTRIC ENERGY STORAGE DEVICE

CROSS REFERENCE TO RELATED APPLICATIONS

This is a National stage application of International application No. PCT/EP2020/051327, filed 21 Jan. 2020, which claims priority of European application No. 19153698.6, filed 25 Jan. 2019, which is incorporated herein by reference in its entirety.

FIELD OF THE INVENTION

The present invention relates to an electric energy storage device, in particular a battery.

BACKGROUND OF THE INVENTION

Various electric energy storage devices such as lithium-sulphur and sodium-sulphur batteries are known in the art. As an example, WO2019/020561, published after the priority date of the present application, describes electric energy storage device, in particular a battery, at least comprising an anode comprising a monovalent alkali metal selected from lithium and sodium or a combination thereof; a cathode comprising a sulphur-containing organosilane compound or a mixture of sulphur-containing organosilane compounds; and an electrolyte placed between the anode and the cathode; wherein the cathode comprises a current collector surface that has been at least partly modified by grafting the sulphur-containing organosilane compound or a mixture of sulphur-containing organosilane compounds thereon. New developments in electric energy storage devices are taking place in the area of magnesium-sulphur batteries, magnesium being a bivalent alkaline earth metal.

Magnesium-sulphur batteries present an attractive option for battery chemistry for several reasons. Due to its divalency and small ionic radius, Magnesium provides for a larger energy capacity on a volumetric basis than Lithium. Both Magnesium and Sulphur are common materials that are abundantly available at a low cost compared to Lithium and other metals such as Cobalt that are commonly employed in Lithium ion batteries. In addition, Magnesium displays an inherently safer chemistry as it does not present similar fire hazards when exposed to oxygen or air as does Lithium.

A recent article by Zhirong Zhao-Karger et al. ("*Magnesium-sulphur battery: its beginning and recent progress*", MRS Communications (2017), 7, pages 770-784) explains the principles of Mg—S batteries, as well as the technical challenges and recent developments. Compared with the extensive technological advancements in Li—S batteries, the developments of Mg—S batterie are still in an early stage. Significant challenges in developing Mg—S batteries relate for example to finding a suitable electrolyte that is capable of reversing Mg deposition and dissolution in a wide operating voltage range. Although some electrolytes are known with promising electrochemical characteristics, more research is needed to further improve the Mg—S system. Efforts in cathode design and optimization of electrolyte solvent and/or solvent blend are critical for further development in this area.

The literature shows that the reaction with sulphur of metals commonly employed for battery anodes may form large polysulfides that may easily dissolve in liquid organic electrolytes and hence give rise to a loss of sulphur at cathode material thereby severely degrading the battery capacity in time (see for example: A. Manthiram et al. ("*Rechargeable Lithium-Sulphur batteries*", Chem. Rev. 2014, 114, pages 11751-11787). This effect is referred to as the "shuttling effect".

Furthermore, another challenge is presented by the use of elemental sulphur which is crystalline at ambient conditions. The orthorhombic crystal structure is thermodynamically favoured, however during crystallization monocline sulphur may also occur which can slowly convert to the orthorhombic form. Such crystallization will occur in a sulphur battery as the charging/discharging induces the formation reaction of Magnesium with sulphur into a bound species and subsequently the reverse separation to Magnesium and sulphur, including the latter's (re-)crystallization. The "solid/solid" transition from monoclinic to preferred orthorhombic sulphur also implies volume changes as the orthorhombic form is denser by a few percent. Crack formation in solid sulphur associated with such densification, can be detrimental at the battery cathode as material connectivity is lost by crack occurrence and therefore also the conductivity paths (necessary for electrical currents to flow with in the battery) cease to exist towards this the "cracked off" sulphur region. In addition, such shrinkage may induce an undesirable loss of electrical contact between the sulphur cathode and the current collector.

It is an object of the present invention to deal with one or more of the above identified problems.

SUMMARY OF THE INVENTION

One or more of the above or other objects can be achieved by providing an electric energy storage device, in particular a battery, at least comprising:
  an anode comprising a divalent metal selected from magnesium, calcium, beryllium and zinc or a combination thereof or an alloy comprising at least one of these metals, and preferably an anode comprising a magnesium-aluminum-zinc alloy;
  a cathode comprising elemental sulphur, or a sulphur-containing organosilane compound, or a mixture of sulphur-containing organosilane compounds, or a mixture of sulphur and sulphur-containing organosilane compounds grafted on the surface of the cathode, and preferably the cathode comprises a sulphur-containing organosilane compound; and
  an electrolyte placed between the anode and the cathode; wherein the cathode comprises a current collector surface that has been at least partly modified by grafting the sulphur-containing organosilane compound or a mixture of sulphur-containing organosilane compounds thereon.

DETAILED DESCRIPTION OF THE INVENTION

It has surprisingly been found according to the present invention that the formation of unwanted, long polysulphides (e.g. containing 4 or more sulphur atoms) in the electrolyte can be reduced or even avoided. Without wanting to be bound by a specific theory, it is believed that the formation of such long polysulphides in the electrolyte is reduced or even avoided because the sulphur-containing organosilane compounds can react with magnesium, calcium, beryllium or zinc (or a combination thereof or an alloy comprising at least one of these metals) from the anode without creating long polysulphides. The reduction or avoidance of the formation of these long polysulphides reduces the above-mentioned 'shuttle effect'.

Also, again without wanting to be bound by theory, it is believed that the silane functionality allows chemical bonding directly to the metal of the current collector of the cathode or conductivity improvers (if any) or indirectly by formation of an oligomerized network. This network may allow flexibility that can mitigate the volume changes when reaction takes place between the sulphur contained in the sulphur-containing organosilane compounds and magnesium, calcium, beryllium or zinc (or a combination thereof or an alloy comprising at least one of these metals). Clearly the grafting also provides proximity and intimate contact between the (organosilane) sulphur species and the current collector.

The person skilled in the art will readily understand that the type of electric energy storage device can vary broadly and may include batteries and supercapacitors. Preferably, the electric energy storage device is a battery, in particular a magnesium-sulphur, a calcium-sulphur, beryllium-sulphur or zinc-sulphur battery or a sulphur battery comprising a combination of these metals or an alloy comprising at least one of these metals, and especially a magnesium-sulphur battery.

As mentioned above, according to the present invention, the anode comprises a divalent metal selected from magnesium, calcium and beryllium or a combination thereof or an alloy comprising at least one of these metals. The alloy may comprise other metals, such as aluminium. The person skilled in the art will readily understand that the anode is not particularly limited, provided it comprises magnesium, calcium, zinc and/or beryllium. This includes many alloys that may provide for substantial fractions of aforementioned divalent metal atoms. As the person skilled in the art will generally be familiar with selecting the anode of Mg—S-type, this is not further discussed here in detail. In a preferred embodiment, the anode comprises only magnesium, calcium, beryllium or zinc as the divalent metal (hence not any type of combination of magnesium, calcium, beryllium or zinc), preferably only magnesium.

The person skilled in the art will readily understand that the cathode is not particularly limited and may be varied broadly. As the person skilled in the art is generally familiar with selecting the cathode of Mg—S batteries, this is not further discussed here in full detail. As mentioned above, according to the present invention, the cathode comprises a sulphur-containing organosilane compound or a mixture thereof (i.e. a mixture of sulphur-containing organosilane compounds).

The cathode comprises a current collector surface that has been at least partly, preferably wholly, modified by grafting the sulphur-containing organosilane compound thereon.

The advantage of chemically grafting of the sulphur-containing organosilane compound onto the current collector is that it allows for a ready contact of the contained sulphur with the current collector of the cathode (or the conductivity improver discussed below). The grafted organosilane forms a thin layer (or flexible oligomeric network) on the surface of the current collector (or the conductivity improver discussed below) which is not as brittle as elemental sulphur. As a consequence, the crack-induced material degradation and related loss of electrical conductance are reduced upon reacting lithium or sodium with the sulphur contained in the sulphur-containing organosilane.

As the person skilled in the art is familiar with selecting the current collector, this is not further discussed here in detail. Typically, the current collector has a resistivity (p) of at most 10 Ω·m, preferably at most 1 Ω·m. Usually, the current collector comprises metal, functionalized carbon, etc. According to the present invention it is particularly preferred that the current collector is comprised of a material that allows for grafting of sulphur-containing organosilane compounds (preferably via hydroxyl or alkoxy groups of the sulphur-containing organosilane compounds, if any). Preferably, the current collector comprises aluminium. Even more preferably, at least 80 wt. % of the current collector is comprised of aluminium.

Furthermore, it is preferred that the cathode comprises one or more conductivity improvers, preferably selected from the group consisting of metal particles, carbon particles or a combination thereof. Suitable examples of metal particles are aluminium, copper, silver and titanium particles, preferably aluminium particles. Suitable examples of carbon particles are graphite, soot, carbon black, carbon fibers, carbon nanotubes, graphene. Other suitable conductivity improvers are silica particles.

The person skilled in the art will readily understand that the grafting of the sulphur-containing organosilane compound on the current collector surface of the cathode can be achieved in various ways. As the person skilled in the art is familiar with grafting, this is not described here in much detail. Typically, the grafting according to the present invention results in the attachment of the sulphur-containing organosilane compound to the current collector surface of the cathode by establishing one or more chemical bonds via the silane groups directly onto the current collector surface or onto already attached organosilane. Typically, the grafting according to the present invention comprises the steps of cleaning the surface of the current collector of the cathode, applying the sulphur-containing organosilane compound (either pure or via a solvent) onto the current collector surface and allowing a reaction to establish a chemical bonding between the silane and the current collector surface.

The person skilled in the art readily understand that the nature of the sulphur-containing organosilane compounds may vary widely and is not particularly limited. Organosilanes are compounds having at least one carbon-silicon bond.

According to a preferred embodiment according to the present invention, the sulphur-containing organosilane compound has the general molecular formula (I):

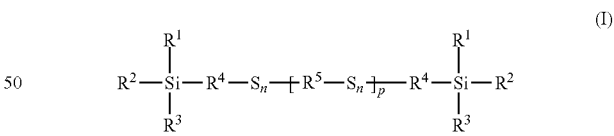

wherein $R^1$, $R^2$ and $R^3$ are independently selected from $C_{1-12}$ alkoxy, acyloxy, aryloxy, alkyl, aryl, hydroxyl (OH) and halogen groups;
wherein $R^4$ is independently selected from a divalent hydrocarbon, preferably a $C_{1-18}$ alkylene or arylene; wherein n is independently selected from an integer from 1 to 10;
wherein $R^5$ is selected from a divalent $C_{2-8}$ hydrocarbon, preferably alkylene or arylene; and
wherein p is independently selected from an integer including zero (0).

As mentioned above, $R^1$, $R^2$ and $R^3$ are independently selected from $C_{1-12}$ alkoxy, acyloxy, aryloxy, alkyl, aryl, hydroxyl (OH) and halogen groups. Preferably, the $C_{1-12}$ alkoxy, acyloxy, aryloxy, alkyl, aryl groups are $C_{1-6}$ groups (and in case not an aryl or aryloxy group: more preferably $C_{1-5}$ groups, even more preferably $C_{1-2}$ groups).

Preferably, $R^1$, $R^2$ and $R^3$ are independently selected from alkoxy and hydroxyl groups. It is particularly preferred that $R^1$, $R^2$ and $R^3$ are independently selected from ethoxy and hydroxyl groups.

As mentioned above, $R^4$ is independently selected from a divalent hydrocarbon, preferably $C_{1-18}$ alkylene or arylene group. More preferably, $R^4$ is independently selected from a $C_{1-10}$ alkylene, even more preferably a $C_{1-6}$ alkylene, yet even more preferably a $C_{1-3}$ alkylene group.

As mentioned above, n is independently selected from an integer from 1 to 10. Preferably, n is independently selected from an integer from 2 to 8, more preferably from 2 to 4.

As mentioned above, $R^5$ is selected from a divalent $C_{2-8}$ alkylene and arylene. Preferably, $R^5$ is selected from a divalent $C_{2-6}$ alkylene and arylene.

Preferably, p is selected from an integer from 0 to 20, more preferably at most 10, more preferably at most 6. Even more preferably p is 0.

According to an especially preferred embodiment of the present invention, the sulphur-containing organosilane compound is a bis(3-triethoxysilylpropyl)-polysulphide or an organosilane compound prepared by copolymerization of elemental sulphur and vinyl groups with silane functionalities such as vinyltriethoxysilane (VIES). The 'poly' in bis(3-triethoxysilylpropyl)-polysulphide typically has a value from 2 to 8, and the average is preferably about 2 or about 4. The person skilled in the art knows that commercially available compounds of this type (such as trade names Si69 and Si75 from Evonik Industries AG (Essen, Germany) may contain mixtures of varying sulphur-bridge length. According to the present invention there is a preference for using bis(3-triethoxysilylpropyl)tetrasulphide [TESPT] and bis(3-triethoxysilylpropyl)disulphide [TESPD] (in formula I: $R^1/R^2/R^3$=ethoxy, $R^4$=propylene, p=0) either in pure form or in mixtures with other polysulphides of this kind with a different sulphur-bridge length.

As already mentioned above, but emphasized for the sake of clarity, the cathode may comprise one sulphur-containing organosilane compound or a mixture of sulphur-containing organosilane compounds.

The electric energy storage device according to the invention comprises an electrolyte between the anode and the cathode. The person skilled in the art will readily understand that the electrolyte can be varied widely and is not particularly limited. Suitable examples of electrolytes are similar to those disclosed for Li—S batteries (A. Manthiram et al. ("*Rechargeable Lithium-Sulphur batteries*", Chem. Rev. 2014, 114, pages 11751-11787).

As the person skilled in the art of Mg—S(and Li—S) type batteries is familiar with grafting, this is not described here in further detail. If desired, the at least partly modified current collector surface can be dried at elevated temperatures or by using a vacuum oven to remove or reduce any residual solvent used and/or moisture content. Typical drying temperatures are from 60-100° C. Applied vacuum is typically in the order of $10^{-2}$ mbar.

Figure 1:
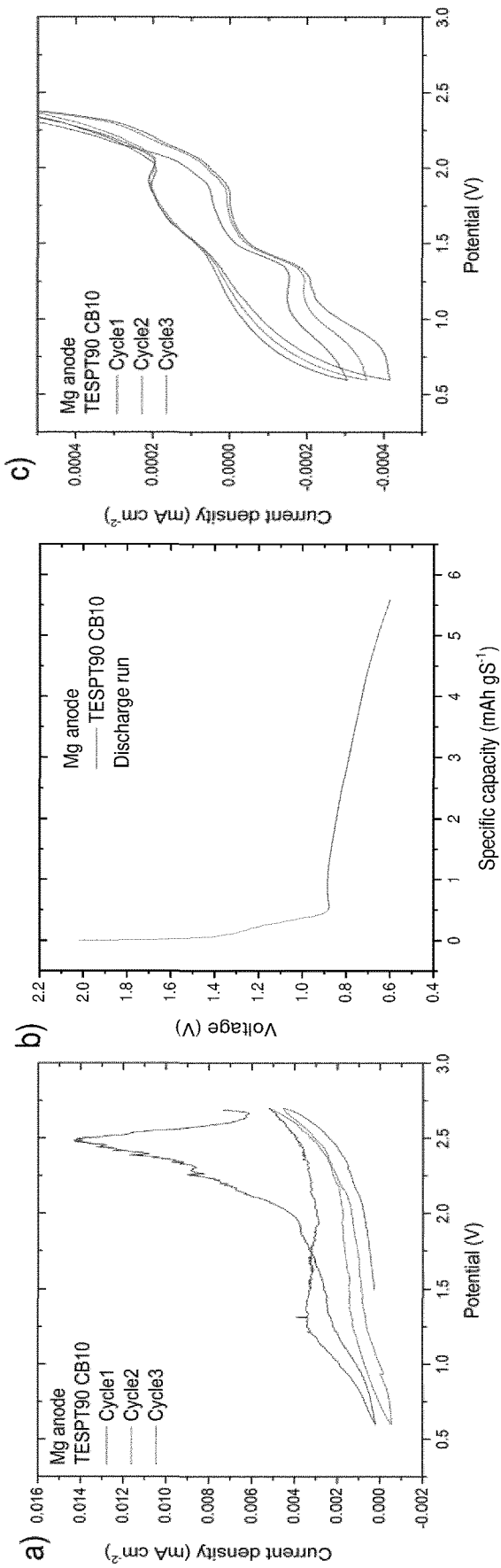
FIG. 1. Electrochemical experiments performed on Mg-TESPT battery (see Example 3): a) CV curves recorded after battery preparation; b) discharge capacity measured after 'activation' charge-discharge cycles performed after the first CV measurements; c) CV curves recorded after the charge-discharge measurements, showing clear peaks during the reduction and oxidation.

Hereinafter the invention will be further illustrated by the following non-limiting examples.

EXAMPLES

Examples 1-2 (Reaction Between Mg or Ca and TESPT)

In order to assess the reactivity of Mg and Ca towards the sulphur, incorporated in organosilanes, pieces of Mg or Ca metals were brought in contact with a solution of the organosilane bis(3-triethoxysilylpropyl)tetrasulphide (TESPT, which contains on average 4 sulphur atoms per molecule) in deuterated Tetrahydrofuran (THF). The mixtures were allowed to react and the reaction was followed over time using $H^1$-NMR and visual observations. After 30 days, approximately 300 mg of the reaction mixtures was used for elemental analysis using Inductively Coupled Plasma (ICP) technique. The reactions were performed under ambient temperature and pressure, in an Argon glovebox.

Example 1: 4.3 mg Mg (Mg—Al—Zn alloy 94/4/1) was added to 21.2 mg of TESPT dissolved in 0.7 ml of deuterated THF. Before adding the Mg alloy to the TESPT solution, it was scratched with a razor blade to remove the oxide layer.

Example 2: 8.9 mg Calcium metal (Ca) was added to 19.6 mg of TESPT dissolved in 0.7 ml of deuterated THF.

Visual Observations

No changes were observed in the color of the mixtures during the reaction period of 30 days, which indicates no formation of significant amount of Mg or Ca polysulfides, otherwise there should be a change in color observed.

$H^1$-NMR

No significant changes in the NMR spectrum of the mixtures were observed during the first one week of the reaction, suggesting the TESPT molecules stay intact.

Elemental Analysis

The results of the elemental analysis show presence of Mg or Ca in the solution, which means that the Mg or Ca atoms have inserted themselves in the S bridge of TESPT. The mass fractions of the different elements are shown in Table 1 and the molar ratios in Table 2.

TABLE 1

Mass fraction of different elements in Mg-TESPT and Ca-TESPT samples in THF-d8.

| Sample | Data from Elemental analysis (wt. %) | | | |
|---|---|---|---|---|
| | S | Si | Mg | Ca |
| TESPT | 0.78 | 0.32 | — | — |
| TESPT + Mg | 0.30 | 0.16 | 0.06 | — |
| TESPT + Ca | 0.33 | 0.19 | — | 0.07 |

TABLE 2

Molar ratios calculated from the elemental analysis.

| Sample | S:Si | S atoms per TESPT molecule | Mg:Si | Mg atoms per TESPT molecule | Ca:Si | Ca atoms per TESPT molecule |
|---|---|---|---|---|---|---|
| TESPT | 2.1:1 | 4.3 | | | | |
| TESPT + Mg | 1.6:1 | 3.3 | 0.4:1 | 0.9 | | |
| TESPT + Ca | 1.5:1 | 3.0 | | | 0.3:1 | 0.5 |

The data suggest that: ~1 Mg atom is incorporated in each TESPT molecule and ~1 Ca atom is incorporated in every second TESPT molecule. After the reaction between TESPT and Mg or Ca, the average number of S atoms per TESPT molecule slightly decreases (from 4 to 3), possibly due to formation of insoluble MgS and CaS.

Example 3 (Coin-Cell Battery with TESPT)

Cathode Preparation

The organosilane bis(3-triethoxysilylpropyl)tetrasulphide (TESPT) was pre-hydrolyzed in a mixture of 15 wt. % $H_2O$ and 15 wt. % of isopropyl alcohol (IPA) at 70° C. while stirring for 2 hours. Carbon black (CB, Super P) was dispersed and ultra-sonicated in an excess of IPA. Next, the pre-hydrolyzed organosilane in IPA was mixed with the carbon black dispersion in IPA and the mixture was ultra-sonicated for 1 hour. The mass ratio between TESPT and CB in the slurry was 9:1. Finally, this slurry was spread onto an Aluminum foil with a 120 μm Doctor blade and dried under vacuum at 110° C. Disks with a diameter of 15 mm were cut from the dried film on the Al foil and used as cathodes in the coin-cell batteries.

Anode

Magnesium alloy substrate, Mg:Al:Zn 96:3:1, thickness 300 μm, was used as anode material. A disk with diameter 15 mm was cut from the substrate and used as anode.

Electrolyte Preparation

An electrolyte with abbreviation $HMDS_2Mg$—$AlCl_3$ was prepared in an Argon filled glovebox in the following way: 0.62 g of magnesium bis(hexamethyldisilazide) (($MgHMDS)_2$) was dissolved in 2 ml of tetraglyme and stirred at room temperature for 2 hours. Next, 0.48 g of aluminum chloride ($AlCl_3$) was very slowly added to the mixture and stirred for 36 hours at room temperature. Finally, 0.17 g of magnesium chloride ($MgCl_2$) was slowly added to the mixture and stirred for 48 hours at room temperature.

Coin-Cell Preparation

Coin cell 2032 batteries were assembled in an Argon filled glovebox. As a separator was used a Celgard 2400 membrane cut to a disk with a diameter 20 mm. The cathode, anode and separator were pre-soaked in the electrolyte for 10 min before assembling the battery. The batteries were crimped using an electric crimping machine (MSK-E110 from MTI Corp.).

Prior to electrochemical tests, the battery was rested for 12 h to enable full wetting of electrolyte throughout the cell.

Electrochemistry Measurements

Cyclic voltammetry (CV) curves were recorded using an Autolab potentiostat from Metrohm Autolab B.V. (Utrecht, Netherlands). The CV curves were obtained with following settings: rate 0.05 mV s$^{-1}$, step 0.00244 V, lower potential 0.6 V, upper potential 2.7 V.

The first CV test (see FIG. 1a) showed that the TESPT-Mg battery had no activity, hence it was decided to 'activate' the battery by running a charge-discharge cycles at increasing currents. The galvanostatic charge-discharge cycling experiments were performed with a programmable M2300 series galvanostat (Maccor, Tulsa, USA). The battery was charged-discharged seven times between 0.6 and 2.7 V, each time using a different, increasing current: $2 \times 10^{-8}$, $5 \times 10^{-8}$, $1 \times 10^{-7}$, $5 \times 10^{-7}$, $1 \times 10^{-8}$, $5 \times 10^{-8}$ and $1 \times 10^{-8}$ A. As expected, the battery indeed showed an electrochemical activity, albeit the capacity was minimal (see FIG. 1b). It is important to note, that no Mg polysulfide plateau at ~1.5 V (according to literature) was observed in the capacity plot (see FIG. 1b), which is a strong evidence of the absence of MgS, polysulfide species.

After the 'activating' charge-discharge cycles, a new CV was recorded on the battery (see FIG. 1c), and indeed now an electrochemical activity was registered. Two reduction peaks at ~2.0 V and 1.3 V are clearly visible, as well as a broad oxidation peak at ~1.8 V. These results demonstrate a working Mg-s battery with TESPT-based cathode.

Example 4 (Coin-Cell Battery with $S_8$)

Cathode Preparation

A reference cathode (labeled in the report as 'Sref' or 'S80CB10PVDF10') was prepared using elemental sulphur (S) as the active material. The procedure for the cathode preparation is as follows: 0.8 g of sulphur powder was mixed with 0.1 g of CB and stirred for 2 hours; 0.1 g of Poly (vinylidene fluoride) (PVDF) was dissolved in 2 ml of N-methyl-2-pyrrolidone (NMP) at 70° C. and stirred; next PVDF solution in NMP was added to the mixture of S and CB and ultra sonicated for 2 hours. The black slurry was then casted on the Al foil with a bar coater and dried at 80° C. and vacuum for 48 hours. 15 mm diameter disks were then cut and used as cathodes.

Anode and Electrolyte were the same as used in Example 3, only the anode disk thickness was 250 μm instead of 300 μm.

Coin cell preparation was the same as described in Example 3, with the only difference that prior to electrochemical tests, the battery was rested for 16 h.

Electrochemistry Measurements

Cyclic voltammetry (CV) curves were recorded using an Autolab potentiostat from Metrohm Autolab B.V. (Utrecht, Netherlands). The CV curves were obtained with following settings: rate 0.05 mV s$^{-1}$, step 0.00244 V, lower potential 0.6 V, upper potential 2.5 V.

Figure 2:
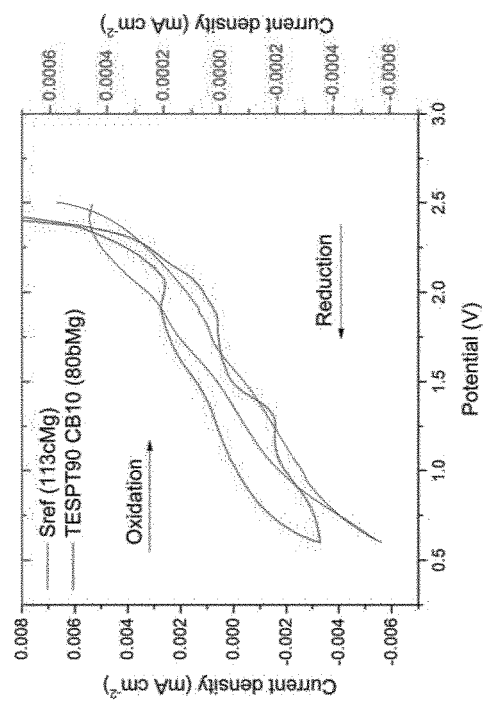
FIG. 2. Comparison of CV curves recorded for Mg batteries with S reference cathode (113cMg, Example 4) and TESPT cathode (80bMg, Example 3).

Similarly to Example 3, the first CV test with the reference battery showed no activity, hence the battery was 'activated' by running a charge-discharge cycles at increasing currents. The galvanostatic charge-discharge cycling experiments were performed with a programmable M2300 series galvanostat (Maccor, Tulsa, USA). The battery was charged-discharged four times between 0.6 and 2.5 V, each time using a different, increasing current: $1\times10^{-7}$, $1\times10^{-6}$, $5\times10^{-6}$ and $1\times10^{-5}$ A. Once the S reference battery was cycled in Maccor at increasing currents, CV measurements were performed again. The data for the reference battery are compared to those from Example 3 (Mg battery with TESPT cathode) in FIG. 2. Similarly to the battery in Example 3, the reference battery has peaks on reduction and oxidation cycles, albeit not so well pronounced, and its current density is ~10 times higher than Mg-TESPT battery.

Example 5 (Failed Activation)

Cathode Preparation

The cathode was prepared by pre-coating CB with TESPT in order to improve the conductivity and mechanical stability of the film (labeled as TESPT-CB). In this experiment, 0.9 g of TESPT was mixed with 0.1 g of CB and left to react at 80° C. for 12 hours. Next, the TESPT-CB mixture was washed with IPA on a paper filter 10 times and left to dry for 3 hours. This TESPT-CB mixture was then mixed with 10 wt. % of PVDF dissolved in NMP (resulting mass ratio TESPT-CB:PVDF=9:1), coated on Al foil with a razor blade and dried under vacuum at 110° C. for 96 hours. The S content in the film was measured by XPS and found to be 15.7 weight %.15 mm diameter disks were then cut from the film and used as cathodes.

Anode and Electrolyte were the same as used in Example 3, except the anode disk thickness was 250 µm, instead of 300 µm.

Coin cell preparation was the same as described in Example 3, with the only difference that prior to electrochemical tests, the battery was rested for 26 h.

Electrochemistry Measurements

Figure 3:
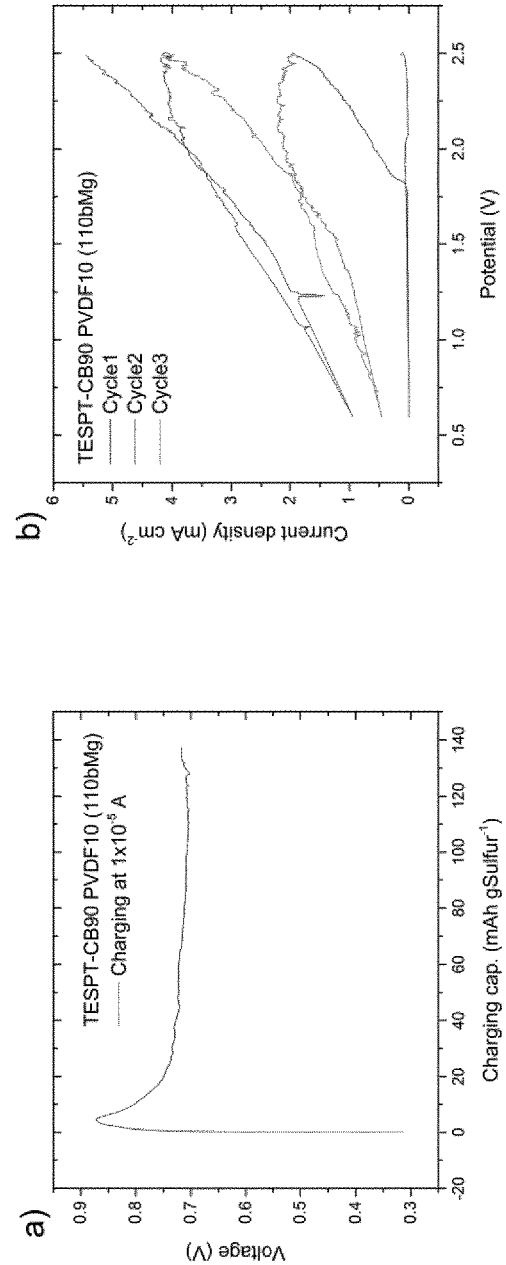
FIG. 3. Electrochemical experiments performed on Mg-TESPT battery as described in Example 5: a) charging capacity measured during 'activation' procedure; b) CV curves recorded after the 'activation' measurements.

In this experiment no CV was recorder prior to the "activation". After the resting period, the battery was directly "activated" by running charge-discharge cycles at increasing currents. The galvanostatic charge-discharge cycling experiments were performed with a programmable M2300 series galvanostat (Maccor, Tulsa, USA). The battery was charged-discharged six times between 0.6 and 2.5 V, each time using a different, increasing current: $1\times10^{-8}$, $5\times10^{-8}$, $1\times10^{-7}$, $1\times10^{-6}$, $5\times10^{-6}$ and $1\times10^{-5}$ A. There was a measurable capacity at the end of the 'activation' procedure, when charging the battery at $1\times10^{-5}$ A, as shown in FIG. 3a.

After the activation, CV curves were recorded using an Autolab potentiostat from Metrohm Autolab B.V. (Utrecht, Netherlands). The CV curves were obtained with the following settings: rate 0.05 mV s$^{-1}$, step 0.00244 V, lower potential 0.6 V, upper potential 2.5 V. The battery showed no electrochemical activity when the CV measurement was performed, in contrast to Examples 3 and 4 where after the 'activation', the batteries showed electrochemical activity.

CONCLUSIONS

It was shown that TESPT organosilane can be used as a cathode material with divalent metals: Mg alloy (94 wt % Mg) and Ca as anodes.

The elemental analysis of the reaction products between TESPT and Mg alloy or Ca metal in THF demonstrated that TESPT was reacting with Mg alloy and Ca metal: ~1 Mg atom was incorporated in each TESPT molecule and ~1 Ca atom is incorporated in every second TESPT molecule. No long Mg or Ca polysulfides were formed during reactions as confirmed by visual observations and HMP measurements. The electrochemical tests demonstrated that an activation by a charge-discharge cycle was necessary for the Mg battery, after which a CV curve could be recorded. The CV curve measured for Mg-TESPT battery had pronounced peaks in the oxidation and reduction cycles, proving that it was indeed an active battery with electrochemistry comparable to a literature data for Mg—S battery. The data for the Mg-TESPT battery indicated strong That we claim:

1. A battery selected from a magnesium-sulphur, a calcium-sulphur, beryllium-sulphur or zinc-sulphur battery, at least comprising:
   an anode comprising a divalent metal selected from magnesium, calcium, beryllium and zinc or a combination thereof or an alloy comprising at least one of these metals;
   a cathode comprising a current collector surface; and
   an electrolyte placed between the anode and the cathode;
   wherein the current collector surface that has been at least partly modified by grafting the sulphur-containing organosilane compound or a mixture of sulphur-containing organosilane compounds thereon-wherein the sulphur-containing organosilane compound has the general molecular formula (I):

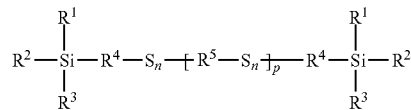

wherein R$^1$, R$^2$ and R$^3$ are independently selected from C$_{1-12}$ alkoxy, acyloxy, aryloxy, alkyl, aryl, hydroxyl (OH) and halogen groups;
wherein R$^4$ is independently selected from a divalent hydrocarbon, preferably a C$_{1-18}$ alkylene or arylene;
wherein n is independently selected from an integer from 1 to 10;
wherein R$^5$ is selected from a divalent C$_{2-8}$ hydrocarbon, preferably alkylene or arylene; and
wherein p is independently selected from an integer including zero (0);
or an organosilane compound prepared by copolymerization of elemental sulphur and vinyl groups with silane functionalities such as vinyltriethoxysilane.

2. The battery according to claim 1, wherein anode comprises a magnesium-aluminum-zinc alloy.

3. The battery according to claim 1, wherein the current collector comprises aluminium.

4. The device battery according to claim 1, wherein the cathode comprises one or more conductivity improvers, preferably selected from the group consisting of metal particles, carbon particles or a combination thereof.

5. The battery according to claim 1, wherein R$^1$, R$^2$ and R$^3$ are independently selected from ethoxy and hydroxyl groups.

6. The device battery according to claim 1, wherein the sulphur-containing organosilane compound is a bis(3-triethoxysilylpropyl) polysulphide or an organosilane compound prepared by copolymerization of elemental sulphur and vinyl groups with silane functionalities.

* * * * *